United States Patent [19]

Nakaura

[11] Patent Number: 5,076,725
[45] Date of Patent: Dec. 31, 1991

[54] STRUT MOUNT

[75] Inventor: Hiroaki Nakaura, Kasugai, Japan

[73] Assignee: Tokai Rubber Industries, Ltd., Komaki, Japan

[21] Appl. No.: 596,354

[22] Filed: Oct. 12, 1990

[30] Foreign Application Priority Data

Oct. 12, 1989 [JP] Japan .................. 1-119478[U]

[51] Int. Cl.⁵ .................. F16B 1/00; F16F 7/00
[52] U.S. Cl. ................... 403/227; 403/228; 267/141.2; 267/141.7; 267/220
[58] Field of Search ............. 248/609, 635; 267/220, 267/141, 141.2, 141.7, 292; 403/225, 226, 227, 228

[56] References Cited

U.S. PATENT DOCUMENTS

| 2,346,574 | 9/1942 | Guy | 403/227 X |
| 4,767,108 | 8/1988 | Tanaka et al. | 267/141.2 X |
| 4,809,960 | 3/1989 | Kakimoto et al. | 403/225 X |

FOREIGN PATENT DOCUMENTS

| 0038120 | 2/1990 | Japan | 267/220 |
| 0586608 | 3/1947 | United Kingdom | 267/141.3 |
| 1197896 | 7/1970 | United Kingdom | 267/220 |

Primary Examiner—John T. Kwon
Assistant Examiner—John Ryznic
Attorney, Agent, or Firm—Berman & Aisenberg

[57] ABSTRACT

Disclosed is a strut mount comprising an inner cylinder, an outer cylinder disposed coaxial with the inner cylinder, an intermediate cylinder coaxially disposed between the inner cylinder and the outer cylinder, a resilient member interposed between the intermediate cylinder and the outer cylinder, a sliding member interposed, between the inner cylinder and the intermediate cylinder a seal member interposed between an inner peripheral surface of one end of the intermediate cylinder and an outer peripheral surface near one end of the inner cylinder, and a lid member for closing the other end of the intermediate cylinder.

3 Claims, 2 Drawing Sheets

STRUT MOUNT

BACKGROUND OF THE INVENTION

1. Field of the Invention

The present invention relates to a strut mount used for mounting a suspension arm or the like.

2. Description of the Prior Art

Conventionally, a strut mount has been known which comprises, as shown in FIG. 2, an inner cylinder 100 held on a shaft through a mounting bolt inserted into radial bearings 500 secured to an inner peripheral surface, an outer cylinder 200 disposed coaxially with the inner cylinder 100 and a resilient member 400 interposed between the inner cylinder 100 and the outer cylinder 200.

The strut mount of this kind is relatively rotated between the mounting bolt and the radial bearings 500 while receiving a load acting in a diametric direction by the radial bearings 500, and absorbing the diametric relative vibration between the inner cylinder 100 and the outer cylinder 200 by the resilient member 400 interposed between the inner cylinder 100 and the outer cylinder 200.

The aforementioned conventional strut mount using the radial bearings is weak in strength with respect to the axial direction in terms of construction of the radial bearing. Under the condition that a large load acts in an axial direction, it is necessary to use a bearing having a large diameter. However, if the outside diameter of the whole strut mount is made larger, in the case where the outside diameter of the bearing 500 is made larger, the diametric width of the resilient member 400 becomes small through that amount because there is a limit in terms of mounting, thus posing a problem of durability of the resilient member 400.

Furthermore, it is necessary to process the inner cylinder 100 by caulking since the bearing 500 is held on the inner cylinder 100, which poses a problem of increasing the cost.

The object of this invention is to provide a strut mount which has axial strength and in which durability of the resilient member is maintained.

SUMMARY OF THE INVENTION

A strut mount according to the present invention comprises an inner cylinder comprising a main inner cylindrical member having a first flange portion extending diametrically and outwardly near one end and a cylindrical body portion formed integrally with said first flange portion and having a small diameter portion in an outer peripheral surface on the other end, and a sub-inner cylindrical member fitted into the small diameter portion of said cylindrical body portion, and having a second flange portion extending diametrically and outwardly and a short cylindrical portion formed integrally with said second flange portion, an outer cylinder disposed coaxially with said inner cylinder and having a mounting portion projected in a centrifugal direction on one end, the other end thereof constituting a cylindrical portion reduced in diameter in the form of a funnel, an intermediate cylinder coaxially disposed between said inner cylinder and said outer cylinder and having diametrically and outwardly extending portions at least extending diametrically and outwardly near opposite ends thereof, a resilient member interposed between said intermediate cylinder and said outer cylinder, and a sliding member interposed between said inner cylinder and said intermediate cylinder and held by said first flange portion and said second flange portion of said inner cylinder and said diametrically and outwardly extending portions of said intermediate cylinder.

The main inner cylindrical member constituting the inner cylinder is formed with a small diameter portion in the outer peripheral surface of the end on the side not formed with the first flange portion, and the end of the sub-inner cylindrical member is in contact with and held on the axial inward end of said small diameter portion. The second flange portion of the sub-inner cylindrical member is formed at the axial inward end of the sub-inner cylindrical member or near said inward end. The sub-inner cylindrical member is pressed into the small diameter portion of the main inner cylindrical member to be fitted and fixed whereby both the members are connected together.

On one end of the outer cylinder is provided a mounting portion to be mounted on the body side, said mounting portion being projected in a centrifugal direction. The mounting portion is bored in its peripheral direction with bolt holes or the like in an equally spaced relation so that it is fixed on the body side by means of bolts or the like. The other end of the outer cylinder constitutes a cylindrical portion reduced in diameter in the form of a funnel.

Preferably, the intermediate cylinder is in the shape having large diameter ends integrally extending axially and outwardly from the respective diametrically and outwardly extending portions.

The resilient member is molded and vulcanized between the outer cylinder and the intermediate cylinder and can be integrally formed on the outer cylinder and the intermediate cylinder by vulcanization and adhesion.

The sliding member can be fitted and fixed to the intermediate cylinder under pressure. The sliding member is formed in its opposite ends with flanges held by the first flange portion and second flange portion of the inner cylinder and the diametrically and outwardly extending portions of the intermediate cylinder.

Preferably, a seal member is interposed between both inner peripheral ends of the intermediate cylinder and both outer peripheral ends of the inner cylinder to prevent water or the like from entering around the sliding member. In this case, a seal member can be fitted into the large diameter end of the intermediate cylinder. A lid member fitted into one end of the intermediate cylinder or one end of the outer cylinder to close one end of the intermediate cylinder or one end of the outer cylinder can be provided to thereby further enhance the sealing action.

In the strut mount according to the present invention, when a diametric external force exerts between the inner cylinder and the outer cylinder, the resilient member interposed between the outer cylinder and the intermediate cylinder is compressed and deformed in a diametric direction to perform a damping action. When an external force such as to relatively rotate the inner cylinder and outer cylinder, the resilient member performs a damping action while being resiliently deformed in a peripheral direction. However, since the sliding member interposed between the inner cylinder and the outer cylinder rotates on the inner cylinder with a sliding resistance, the peripheral resilient deformation of the resilient member is reduced.

The strut mount according to the present invention is positively defined in an axial direction by holding the sliding member by the first flange portion and the second flange portion provided on the main inner cylindrical member and the sub-inner cylindrical member, respectively, of the inner cylinder, and the diametrically and outwardly extending portions of the intermediate cylinder. Accordingly, even if the large external force is exerted axially, the external force can be positively received by the first flange portion and second flange portion of the inner cylinder and the diametrically and outwardly extending portions of the intermediate cylinder.

DETAILED DESCRIPTION OF THE PREFERRED EMBODIMENT

Figure 1:
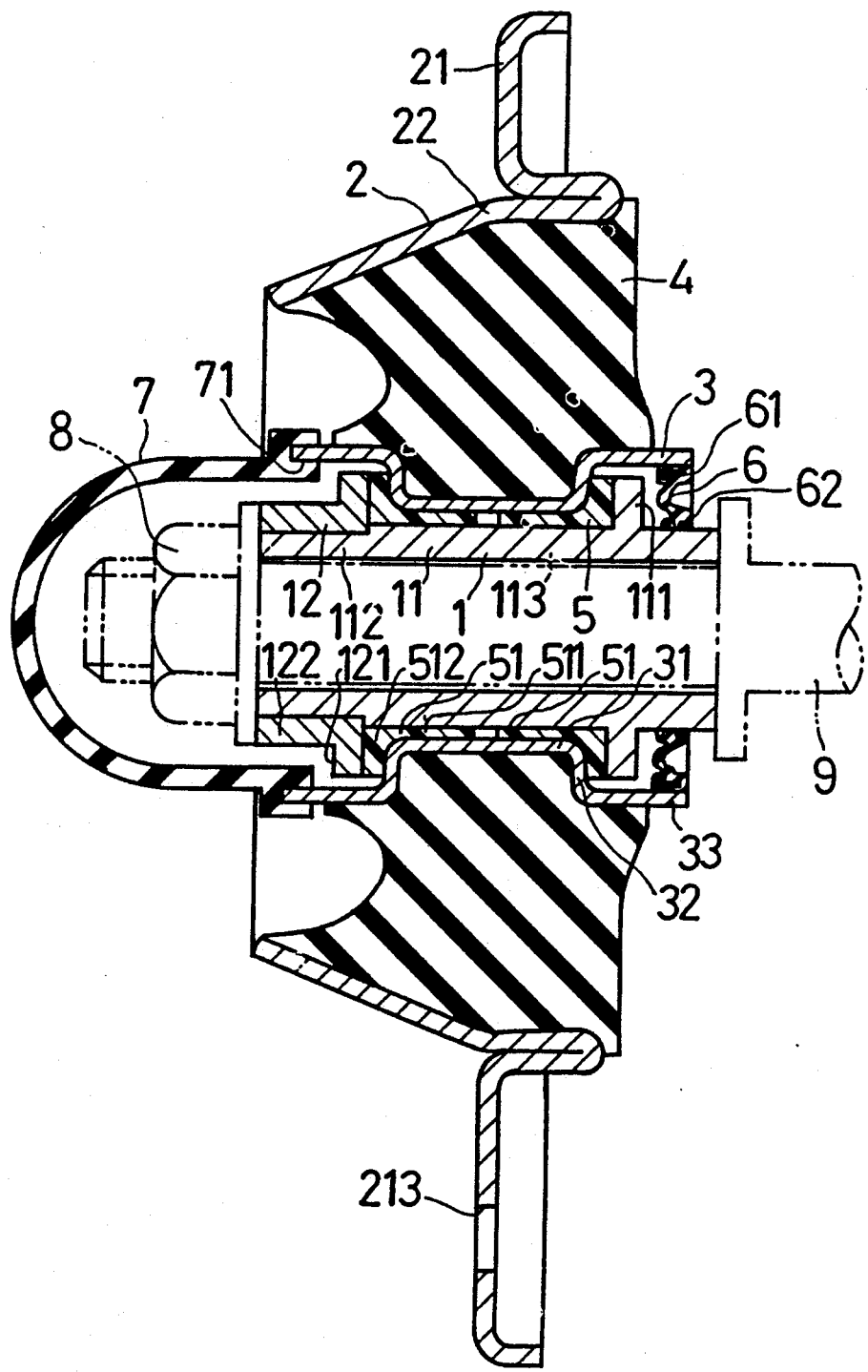
FIG. 1 is a longitudinal sectional view of a strut mount according to the present invention.
Figure 2:
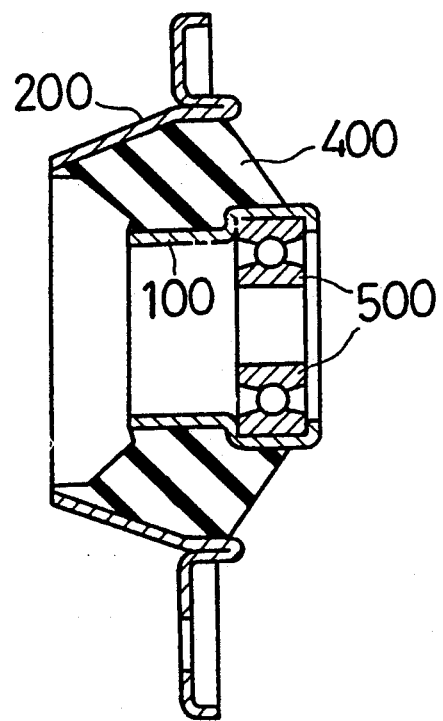
FIG. 2 is a longitudinal sectional view of a conventional strut mount.

The strut mount according to the present invention will be described in detail by way of an embodiment with reference to the drawing.

FIG. 1 is a longitudinal sectional view of a strut mount in the present embodiment. The strut mount in the present embodiment comprises an inner cylinder 1, an outer cylinder 2 disposed coaxially with the inner cylinder 1, an intermediate cylinder 3 coaxially disposed between the inner cylinder 1 and the outer cylinder 2, a resilient member 4 interposed between the intermediate cylinder 3 and the outer cylinder 1, a sliding member 5 interposed between the inner cylinder 1 and the intermediate cylinder 3, a seal member 6 interposed between an inner peripheral surface of one end of the intermediate cylinder 3 and an outer peripheral surface near one end of the inner cylinder 1, and a lid member 7 for closing the other end of the intermediate cylinder 3.

The inner cylinder 1 is composed of a main inner cylindrical member 11 made of metal and a sub-inner cylindrical member 12 made of metal fitted in and secured to the main inner cylindrical member 11. The main inner cylindrical member 11 comprises a first flange portion 111 extending diametrically and outwardly near one end, and a cylindrical body portion 113 formed integrally with the first flange portion 111 and having a small diameter portion 112 in the outer peripheral surface on the other end side. The sub-inner cylindrical member 12 comprises a second flange portion 121 extending diametrally and outwardly on one end side and a short cylindrical portion 122 formed integrally with the second flange portion 121. The second flange portion 121 is fitted in and secured to the outer peripheral surface of the small diameter portion 112 so that the end on the diametric and inward side of the second flange portion 121 comes into contact with the end on the axial and inward side of the small diameter portion 112.

The outer cylinder 2, which is made of metal, comprises a mounting portion 21 extending diametrically and outwardly near one end and a cylindrical portion 22 formed integrally with the mounting portion 21 and which diameter becomes smaller toward the other end. The mounting portion 21 is bored in its peripheral direction with three bolt holes 213 in an equally spaced relation.

The intermediate cylinder 3, which is made of metal, comprises a cylindrical body 31, diametrically and outwardly extending portions 32 extending diametrically and outwardly formed integrally with the cylindrical body 31 on opposite ends of the cylindrical body 31 and large diameter ends 33 continuously extending axially and outwardly from the diametrically and outwardly extending portions 32.

The resilient member 4, which is formed from a rubber resilient body, is joined to the inner peripheral surface of the outer cylinder 2 and outer peripheral surface of the intermediate cylinder 3. The resilient member 4 is filled between the outer cylinder 2 and the intermediate cylinder 3 in the state where they are coaxially arranged and integrated with the outer cylinder 2 and the intermediate cylinder 3 by vulcanizing adhesion.

The sliding member 5 is formed from a pair of semisliding members 51 and 51 formed by injection molding using oil-contained plastics having excellent slidability. The semi-sliding member 51 comprises a cylindrical body 511 held between the outer peripheral surface of the main inner cylindrical member 11 and the inner peripheral surface of the cylindrical body 31 of the intermediate cylinder 3, and a flange 512 formed integrally with one end of the cylindrical body 511 and held between the first flange portion 111 of the main inner cylindrical member 11 and the second flange portion 121 of the sub-inner cylindrical member 12 and the diametrically and outwardly extending portions of the intermediate cylinder 3. The semi-sliding members 51 are fitted into the intermedite cylinder 3 under pressure.

The seal member 6 is in the form of a ring formed of rubber. The seal member 6 is embedded in its outer peripheral surface with a metal ring 61 having an L-shape in section and is secured to the inner peripheral surface of one large diameter end 33 of the intermediate cylinder 3. The seal member 6 is formed in its inner peripheral surface with a pleat-like seal portion 62 and is in sliding contact with the outer peripheral surface on the axial and outward side of the first flange portion 111 of the main inner cylindrical member 11.

The lid member 7, which has an approximately semispherical shape formed of rubber, is formed in its end with a ring-like groove 71 corresponding to the large diameter end 33 of the intermediate cylinder 3.

The strut mount in the present embodiment having the above-described configuration is manufactured in the following procedure.

First, in the state where the outer cylinder 2 and the intermediate cylinder 3 are coaxially arranged, the resilient member 4 is molded and vulcanized, and vulcanized and adhered to the outer cylinder 2 and the intermediate cylinder 3 to thereby form an integral body comprising the outer cylinder 2, the intermediate cylinder 3 and the resilient member 4. The semi-sliding members 51 are fitted into the inner peripheral surface of the intermediate cylinder 3 under pressure, and thereafter the main inner cylindrical member 11 is inserted into the inner peripheral surface of the sliding member 5 from the small diameter portion 112 side. The sub-inner cylindrical member 12 is fitted in and secured to the outer peripheral surface of the small diameter portion 112 under pressure. The main inner cylindrical member 11 is coated in its outer peripheral surface with grease in order to obtain smoother slidability. Subsequently, the seal member 6 is fitted into the inner peripheral surface of one large diameter end 33 of the intermediate cylinder 3 under pressure. In the strut mount according to the instant embodiment, the mounting bolt 8 is inserted into the inner cylinder 1 and mounted on the shaft 9 of a suspension arm or the like, as indicated by the dash-dotted contour lines in FIG. 1, and after the bolt has been fastened, the lid member 7 is fitted into the large diameter end 33 of the intermediate cylinder 3.

In the strut mount according to the present embodiment, when the diametric external force exerts between the inner cylinder 1 and the outer cylinder 2, the resilient member 4 interposed between the outer cylinder 2 and the intermediate cylinder 3 is diametrically compressed and deformed to perform the damping action. When the external force such as to relatively rotate the inner cylinder 1 and the outer cylinder 2 exerts, the resilient member 4 performs the damping action while being resiliently deformed in the peripheral direction. However, since the sliding member 5 interposed between the inner cylinder 1 and the intermediate cylinder 3 is rotated with the sliding resistance, the peripheral resilient deformation of the resilient member 4 is reduced.

The strut mount according to the present embodiment is positively defined axially by holding the sliding member 5 by the first flange portion 111 and the second flange portion 121 provided on the main inner cylindrical member 11 and the sub-inner cylindrical member 12, respectively, of the inner cylinder 1 and the diametrically and outwardly extending portions 32 of the intermediate cylinder 3. Because of this, even if the large external force is exerted in an axial direction, the external force can be surely received by the first flange portion 111 and the second flange portion 121 of the inner cylinder 1 and the diametrically and outwardly extending portions 32 of the intermediate cyinder 3, thus increasing the axial strength.

In the strut mount according to the present embodiment, since the seal member 6 and the lid member 7 are provided, water or the like does not enter around the sliding member 5 and the deterioration of the sliding member 5 can be restrained.

While in the above-described embodiment, a configuration has been described in which the lid member 7 is fitted into one large diameter end 33 of the intermediate cylinder 3 to close one end of the intermediate cylinder 3, it is to be noted that a configuration may be employed in which the seal member 6 is fitted into both the large diameter ends 33 of the intermediate cylinder 3. In this case, it is preferred that the inner diameters of both the large diameter ends 33 between which is interposed the seal member 6 are equal to each other, and the outer diameters of both left and right end portions of the inner cylinder 1 between which is interposed the seal member 6, namely, the outer diameter of the main inner cylindrical member 11 is equal to that of the sub-inner cylindrical member 12. Thereby, the same seal member 6 can be used for both the left and right ends.

As described in detail, the strut mount of the present invention is configured that the sliding member is held by the first flange portion and second flange portion provided on the main inner cylindrical member and sub-inner cylindrical member, respectively, of the inner cylinder and the diametrically and outwardly extending portions of the intermediate cylinder, and therefore, even if the large external force is exerted axially, the external force can be positively received by the first flange portion and second flange portion of the inner cylinder and the diametrically and outwardly extending portions of the intermediate cylinder. Accordingly, the strut mount according to the present invention can secure the desired axial strength without sacrificing the durability of the resilient member.

What is claimed is:

1. A strut mount comprising:
    an inner cylinder composed of a main inner cylindrical member having a first flange portion extending diametrically and outwardly near one end and a cylindrical body portion formed integrally with said first flange portion and having a small diameter portion in an outer peripheral surface on the other end and a sub-inner cylindrical member disposed around the small diameter portion of said cylindrical body portion, and composed of a second flange portion extending diametrically and outwardly and a short cylindrical portion formed integrally with said second flange portion;
    an outer cylinder disposed coaxially with said inner cylinder and having a mounting portion projected in a centrifugal direction on one end, the other end thereof constituting a cylindrical portion reduced in diameter in the form of a funnel;
    an intermediate cylinder coaxially disposed between said inner cylinder and said outer cylinder and having diametrically and outwardly extending portions at least extending diametrically and outwardly near opposite ends thereof;
    a resilient member interposed between said intermediate cylinder and said outer cylinder;
    a sliding member interposed between said inner cylinder and said intermediate cylinder and held by said first flange portion and said second flange portion of said inner cylinder and said diametrically and outwardly extending portions of said intermediate cylinder;
    a seal member disposed adjacent to said first flange portion of said inner cylinder and interposed between an inner peripheral end of said intermediate cylinder and an outer peripheral end of said main inner cylindrical member of said inner cylinder; and
    a lid member disposed adjacent to said second flange portion of said sub-inner cylindrical member of said inner cylinder and fixed on one end of said diametrically and outwardly extending portions of said intermediate cylinder.

2. A strut mount according to claim 1, wherein said main inner cylindrical member constituting said inner cylinder is formed with a small diameter portion in the outer peripheral surface of the end on the side not formed with the first flange portion.

3. A strut mount according to claim 1, wherein said resilient member is vulcanized between said outer cylinder and said intermediate cylinder.

* * * * *